United States Patent
Williamson (10) Patent No.: US 9,033,358 B1
(45) Date of Patent: May 19, 2015

(54) TRAILER HITCH COUPLER GUARD (71) Applicant: Christopher H. Williamson, Wichita, KS (US)

(72) Inventor: Christopher H. Williamson, Wichita, KS (US)

(*) Notice: Subject to any disclaimer, the term of this patent is extended or adjusted under 35 U.S.C. 154(b) by 158 days.

(21) Appl. No.: 13/752,849

(22) Filed: Jan. 29, 2013

(51) Int. Cl.
*B60D 1/60* (2006.01)

(52) U.S. Cl.
CPC .................................... *B60D 1/60* (2013.01)

(58) Field of Classification Search
CPC .................................................. B60D 1/60
USPC ....................................... 280/507, 510; 70/14
See application file for complete search history.

(56) References Cited

U.S. PATENT DOCUMENTS

| | | | | |
|---|---|---|---|---|
| 3,605,457 | A | * | 9/1971 | Foster ................................. 70/14 |
| 4,141,569 | A | * | 2/1979 | Dilk ............................... 280/507 |
| 4,208,065 | A | * | 6/1980 | Hansen .......................... 280/507 |
| 4,291,893 | A | * | 9/1981 | Hansen .......................... 280/507 |
| 4,571,964 | A | * | 2/1986 | Bratzler ............................ 70/58 |
| 4,577,884 | A | * | 3/1986 | Harris ............................ 280/507 |
| 4,730,841 | A | * | 3/1988 | Ponder .......................... 280/501 |
| 5,433,468 | A | * | 7/1995 | Dixon ........................... 280/507 |
| 5,584,495 | A | * | 12/1996 | Mason ........................... 280/507 |
| D388,383 | S | * | 12/1997 | Foster et al. .................. D12/162 |
| 5,775,139 | A | * | 7/1998 | Sellers ............................... 70/14 |
| 6,070,441 | A | * | 6/2000 | Bernstrom ......................... 70/58 |
| 6,244,614 | B1 | * | 6/2001 | Bonvillain et al. ............ 280/507 |
| 6,412,313 | B1 | * | 7/2002 | Bernstrom ........................ 70/14 |
| 6,588,239 | B1 | * | 7/2003 | Johansson .......................... 70/14 |
| 6,598,432 | B1 | * | 7/2003 | Dwyer ............................... 70/14 |
| 7,635,143 | B2 | * | 12/2009 | Pappalardo ................... 280/507 |
| 8,556,288 | B1 | * | 10/2013 | Bale .............................. 280/507 |
| 2008/0023940 | A1 | * | 1/2008 | Warford ........................ 280/507 |
| 2010/0230932 | A1 | * | 9/2010 | Pratt ............................. 280/507 |

* cited by examiner

*Primary Examiner* — Joseph Rocca
*Assistant Examiner* — Conan Duda
(74) *Attorney, Agent, or Firm* — Kenneth H. Jack; Davis & Jack, L.L.C.

(57) ABSTRACT

A trailer hitch coupler guard including a trailer hitch coupler receiving member; a trailer hitch coupler covering member; an extraction stopping lug attached to and extending upwardly from the trailer hitch coupler receiving member; a hinge interconnecting the trailer hitch coupler receiving member and the trailer hitch coupler covering member, the hinge facilitating movement of the trailer hitch coupler covering member between opened and closed positions, the trailer hitch coupler covering member overlying the trailer hitch coupler receiving member upon movement to the closed position, and being displaced away from the closed position upon movement to the opened position; and a pair of eyed flanges fixedly attached to one of the members among the trailer hitch coupler receiving member and the trailer coupler covering member; the flanges' eyes being positioned for alignment with each other.

4 Claims, 7 Drawing Sheets

TRAILER HITCH COUPLER GUARD

CLAIM OF PRIORITY FROM PREVIOUSLY FILED PROVISIONAL PATENT APPLICATION

This non-provisional patent application claims the benefit of and priority from U.S. provisional patent application No. 61/602,720 filed Feb. 24, 2012. The inventor disclosed in said provisional application is the same person as the person who is disclosed as the inventor in the instant application. The applicant asserts that structures and functions of structures disclosed and described in the instant application are substantially identical to those disclosed in said provisional application.

FIELD OF THE INVENTION

This invention relates to trailers and trailer hitches. More particularly, this invention relates to apparatus and assemblies which are specially adapted for preventing unauthorized access to and unauthorized "tow away" use of a trailer's front end coupler.

BACKGROUND OF THE INVENTION

Where towable vehicles such as boat trailers, wheeled campers, and equipment hauling trailers are not in use, they are commonly parked and stored without any attachment to a towing vehicle. During such periods of non-use, the trailer's forward end towing hitch coupler is commonly left exposed, creating a dangerous risk of theft of the trailer. In a common mode of perpetration of such thefts, a criminal may access a tow vehicle having a rear end positive trailer hitch (commonly a steel ball hitch) which is adapted for use with the type of hitch coupler mounted upon the trailer. The criminal may simply back such vehicle to the trailer, engage the trailer's hitch coupler, and drive away with the trailer. Such thefts are often tragic because the trailers constitute valuable property and because the trailers themselves are converted to the criminal's use as a tool of larceny for the perpetration of further thefts of the trailers' contents.

In order to protect against such thefts, various types of locking mechanisms are known to be adapted for mechanically blocking or obstructing a criminal's attachment of a trailer's front end coupler to an unauthorized tow vehicle. However, such locking mechanisms commonly outwardly expose locking structures such as eyed flanges, shackles, bolts, posts, and the like, making them subject to being defeated through a criminal's use of cutting tools such as hacksaws, cutting torches, bolt cutters, and rotary saws.

The instant inventive hitch coupler guard solves or ameliorates problems and defects noted above by configuring a coupler guarding and locking structure to assume a pivoting clamshell or box configuration and by associating with the clamshell or box further barrier structures which are adapted for guarding against attempts to defeat the lock through use of torch cutters, saws, bolt cutters, and the like.

BRIEF SUMMARY OF THE INVENTION

A first structural component of the instant inventive trailer hitch coupler guard comprises a lower trailer hitch coupler receiving member. In a preferred embodiment, such receiving member comprises a floor having a left side, a right side, a forward end, and a rearward end. In the preferred embodiment, the receiving member further comprises left, right, and forward walls, said walls being respectively fixedly attached to (or wholly formed with) and extending substantially equidistantly upwardly from the floor's left right and front sides.

A further structural component of the instant inventive trailer hitch coupler guard comprises an upper coupler covering member. In a preferred embodiment, such covering member comprises a ceiling having a left side, a right side, a forward end, and rearward end. Also in the preferred embodiment, the covering member further comprises left, right, and forward walls, said walls being respectively fixedly attached to (or wholly formed with) and extending substantially equidistantly downwardly from the ceiling's left, right, and forward sides. Preferably, the receiving member and the covering member are fitted and sized with respect to each other so that upon an abutting orientation of the covering member over the receiving member, a rearwardly opening coupler protecting space is formed, such space being fitted and sized for receiving and encasing the forward end of a trailer hitch coupler.

A further structural component of the instant inventive hitch coupler guard comprises an extraction stopping lug, such lug preferably being fixedly attached to and extending upwardly from the coupler receiving member's floor. In a preferred embodiment, and where the guard is adapted for protecting the type of trailer hitch coupler which presents a downwardly opening socket, such lug is sized and fitted for upward extension toward and nesting receipt within such socket. In operation of the inventive guard, upon placement and receipt of such trailer hitch coupler between the walls and over the floor of the coupler's receiving member, the extraction stopping lug advantageously extends upwardly into such coupler's socket and mechanically blocks any extraction or removal of the guard from the hitch coupler in all directions other than downward.

A further structural component of the instant inventive guard comprises a hinge which operatively interconnects in a clamshell configuration the coupler receiving and covering members. In the preferred embodiment, such operative connection is positioned at such members' left or right sides for laterally directed clamshell opening and closing motions. Suitably, though less desirably, the hinged interconnection may be positioned at the clamshell's front end.

A further structural component of the instant inventive guard comprises a pair of eyed flanges, such flanges being fixedly attached to and extending laterally from the guard's preferred clamshell configured coupler receiving and covering members. Where the guard's hinge component is positioned as preferred at the receiving and cover members' left or right sides, the eyed flanges are preferably laterally oppositely positioned at such members' right or left sides. Preferably, the eyes of such flanges are vertically aligned with respect to each other so that, upon hinged motion of the receiving and coupling members to their closed positions, the shackle of a common padlock may extend vertically through such aligned eyes for securing and holding the guard in its protective closed position.

A further structural component of the instant inventive guard comprises a padlock guarding plate which is fixedly attached to a distal or laterally outer end of one of the eyed flanges. In operation, such plate functions in combination with receiving and cover member side walls and in combination with the eyed flanges to form shackle protecting channels.

In use of the instant inventive trailer hitch coupler guard, and assuming provision of the above described preferred structures, the hitch coupler receiving and covering members may initially be pivotally moved to their opened positions. Thereafter, a trailer's front end hitch coupler may be placed within the receiving member, such coupler being positioned so that the extraction stopping lug which extends upwardly from the receiving member's floor is securely received within the coupler's socket. Thereafter, the covering member may be pivotally moved about the hinge to its closed position, such motion simultaneously covering the hitch coupler and aligning the eyes of the eyed flanges. Thereafter, the shackle of a common padlock may be extended through the flanges' eyes, and the padlock may be latched. Upon completion of such receiving, closing, extending, and latching motions and operations, removal of the guard is blocked in all directions, advantageously mechanically obstructing and interfering with any criminal usage of the trailer's coupler for unauthorized towing. The padlock guard which is preferably attached to the distal end of one of the eyed flanges advantageously obstructs and protects against a thief's efforts to cut the shackle of the padlock. The encasing clamshell configuration of the guard similarly protects against the thief's efforts to access and cut the guard's extraction stopping lug.

Accordingly, objects of the instant invention include provision of a hitch coupler protecting guard which incorporates structures, as described above, and which arranges those structures in relation to each other in manners described above for the performance of beneficial functions, as described above.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Referring now to the drawings, and in particular simultaneously to FIGS. 1-4, a preferred embodiment of the instant inventive trailer hitch coupler guard is referred to generally by Reference Arrow 1. The guard 1 preferably comprises a lower coupler receiving member which is preferably configured to include a floor 2, a left wall 4, a right wall 6, and a front wall 24. The left, right, and front walls 4, 6, and 24, are respectively fixedly attached to or formed wholly with the left, right, and front sides of the floor 2, such walls 4, 6, and 24 preferably extending substantially equidistantly upwardly from the floor 2.

Referring further simultaneously to FIGS. 1-4, the instant inventive guard 1 preferably further comprises a cover member comprising a ceiling 26, left and right walls 28 and 30, and a front wall 25. Such walls 28, 30, and 25 are respectively fixedly attached to or formed wholly with the left, right, and front sides of the ceiling 26, and such walls preferably extend substantially equidistantly downwardly.

Figure 1:
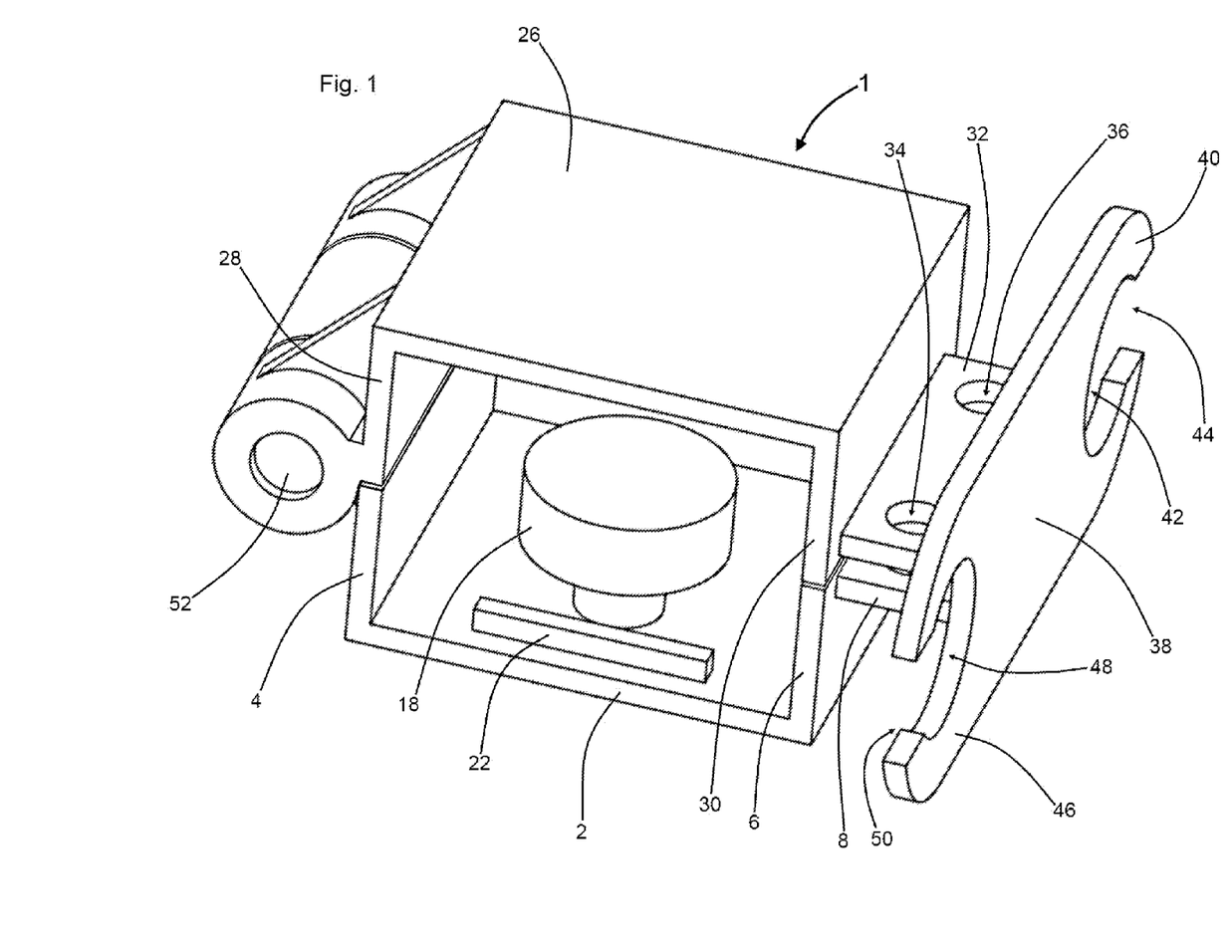
FIG. 1 is a perspective view of a preferred embodiment of the instant inventive trailer hitch coupler guard.
Figure 2:
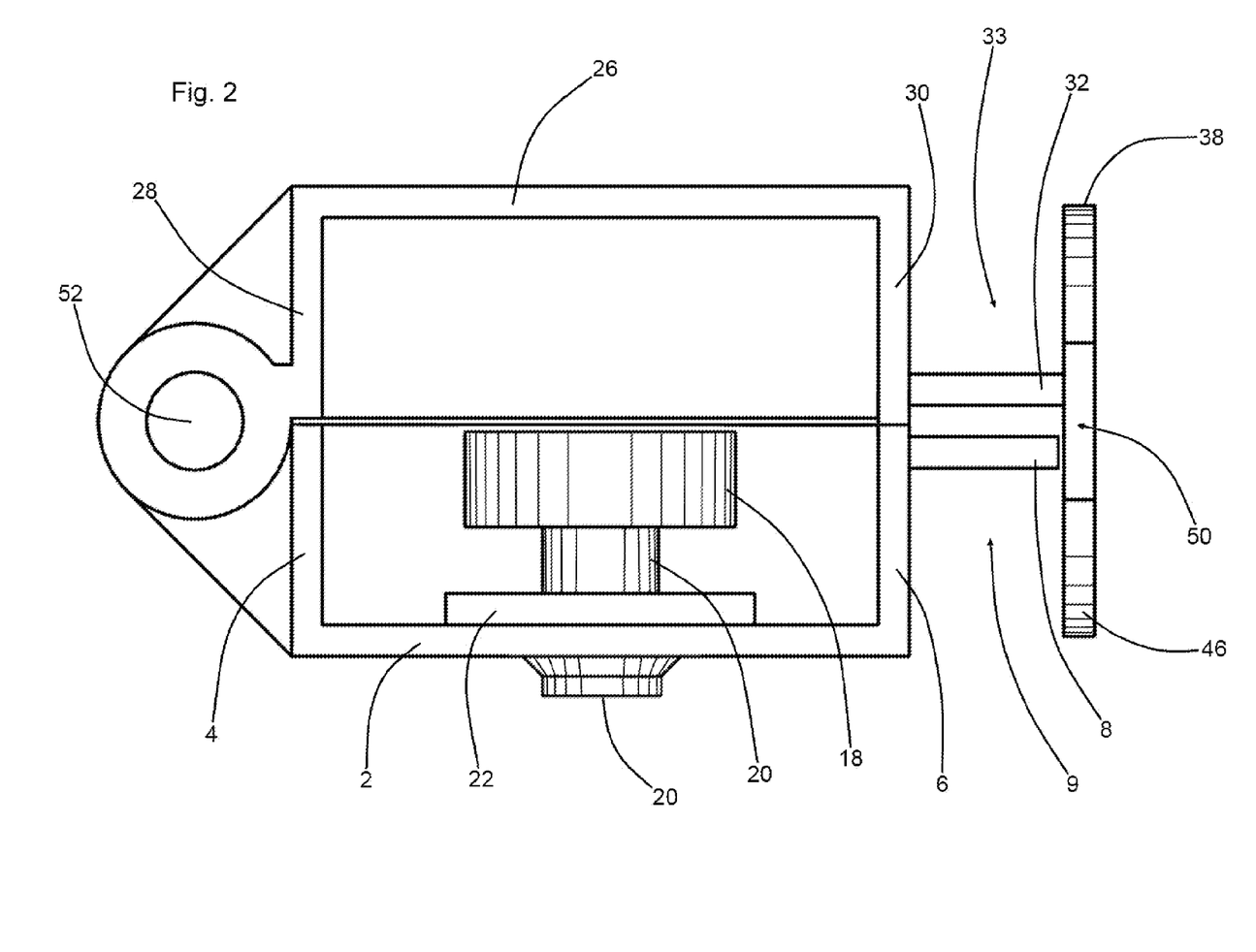
FIG. 2 is a rear plan view of the guard of FIG. 1.
Figure 3:
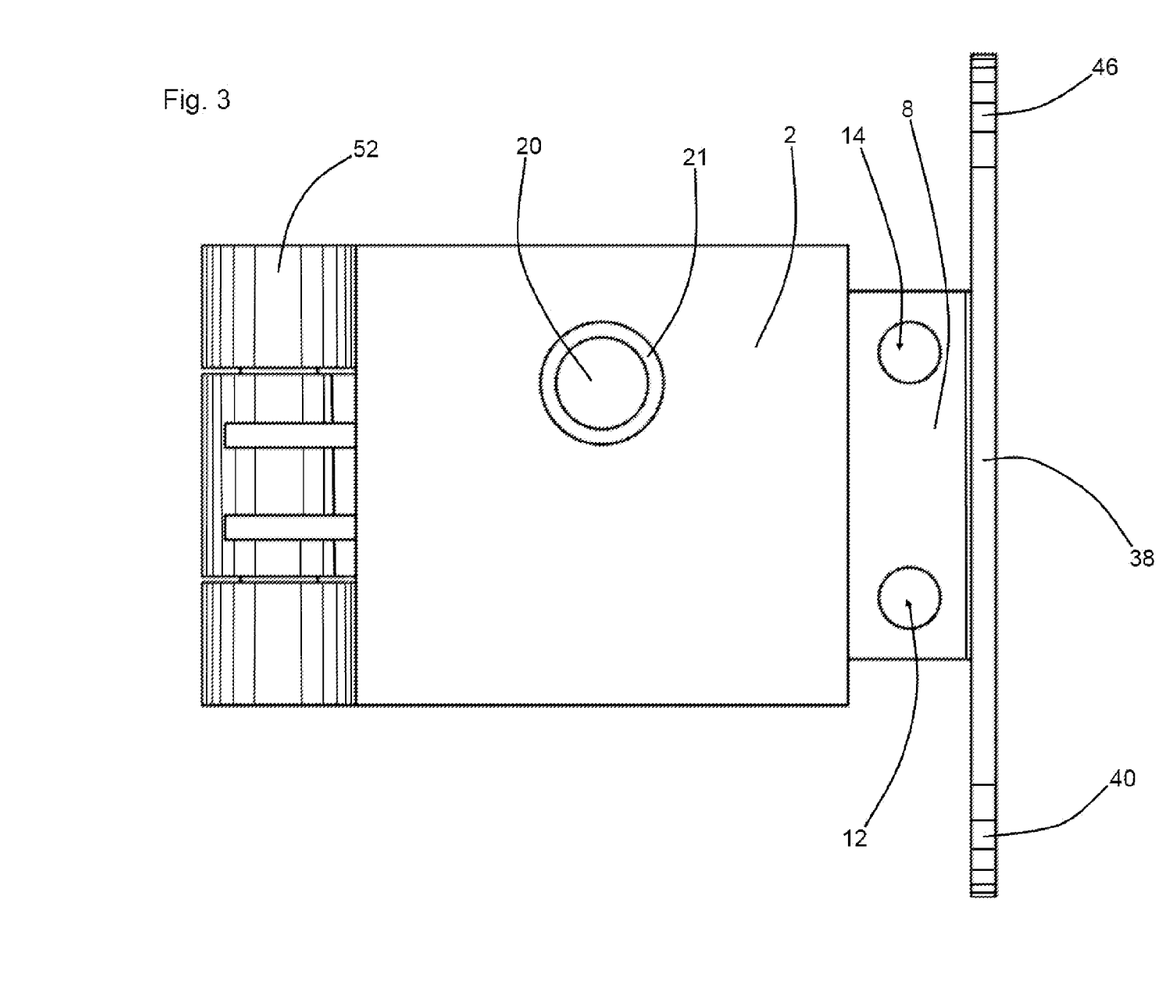
FIG. 3 is a lower plan view of the guard of FIG. 1.
Figure 4:
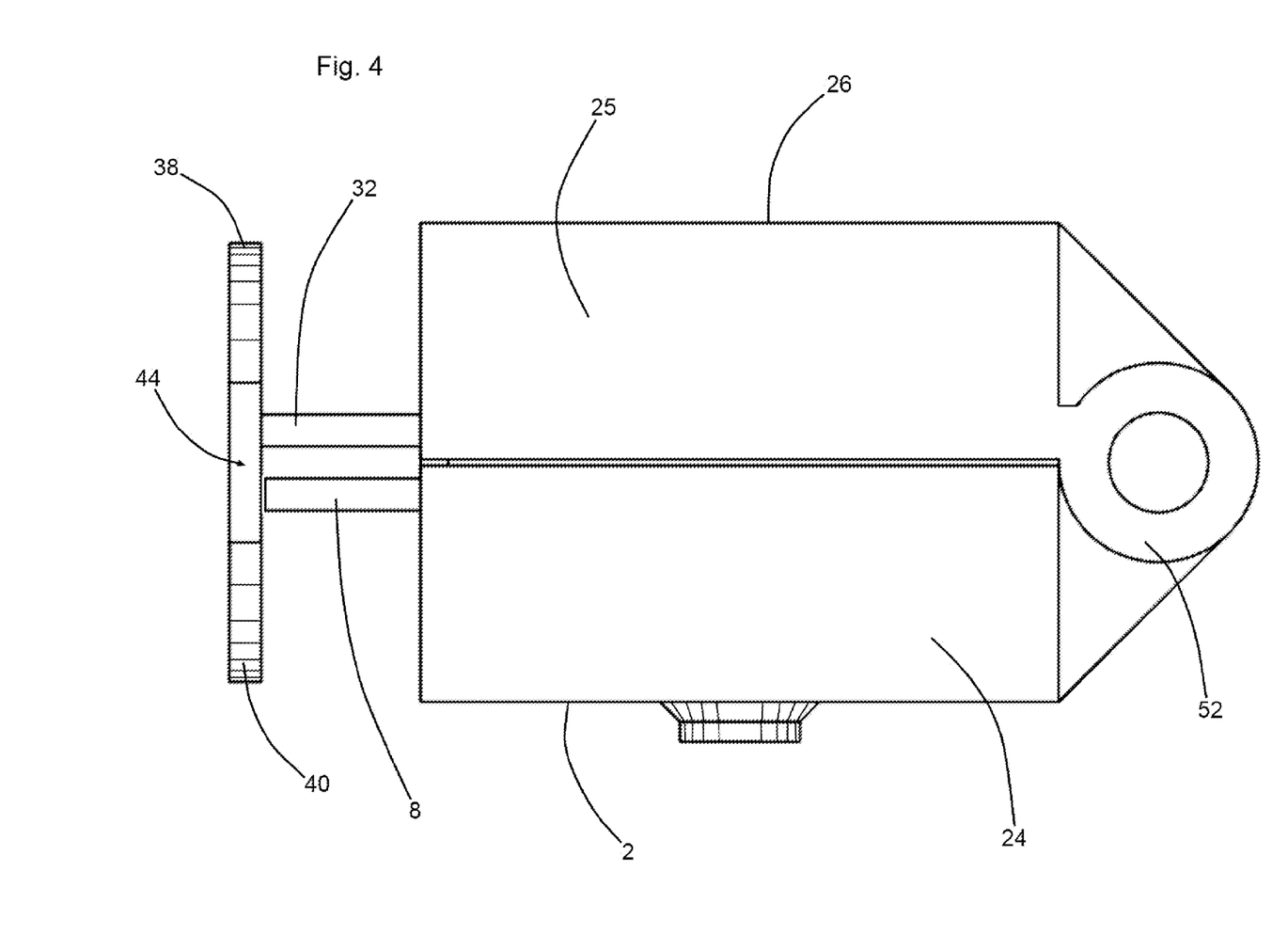
FIG. 4 is a front plan view of the guard of FIG. 1.

Referring simultaneously to FIGS. 1-3, the instant inventive guard 1 preferably further comprises an extraction stopping lug component which is preferably configured as an upper enlarged disk 18 in combination with a downwardly extending support post 20, the post 20 preferably being fixedly attached to or formed wholly with the disk 18. In a preferred embodiment, the diameter of the disk is approximately 1⅞", such sizing allowing the guard 1 to be utilized with couplers adapted for 1⅞" tow balls in addition to those adapted for use with 2" or 2⅝" tow balls.

Referring further to FIGS. 1-3, the post 20 component of the extraction stopping lug 18,20 is preferably securely and fixedly attached to the floor 2 by means of a receipt of the post 20 within a circular aperture within floor 2, and by means of a matching circular weld 21. Such means for mounting the lug 18,20 upon the floor 2 is preferred because, in the event that a thief breaks or degrades weld 21, post 20 remains in engagement within the aperture within floor 2, such engagement continuing to secure the lug 18,20 at its position over the floor 2.

In order to protect post 20 from contact with a metal cutting blade or metal cutting torch flame, a barrier block or flange 22 is preferably fixedly welded to the floor 2 at a location immediately rearwardly from the post 20.

Figure 5:
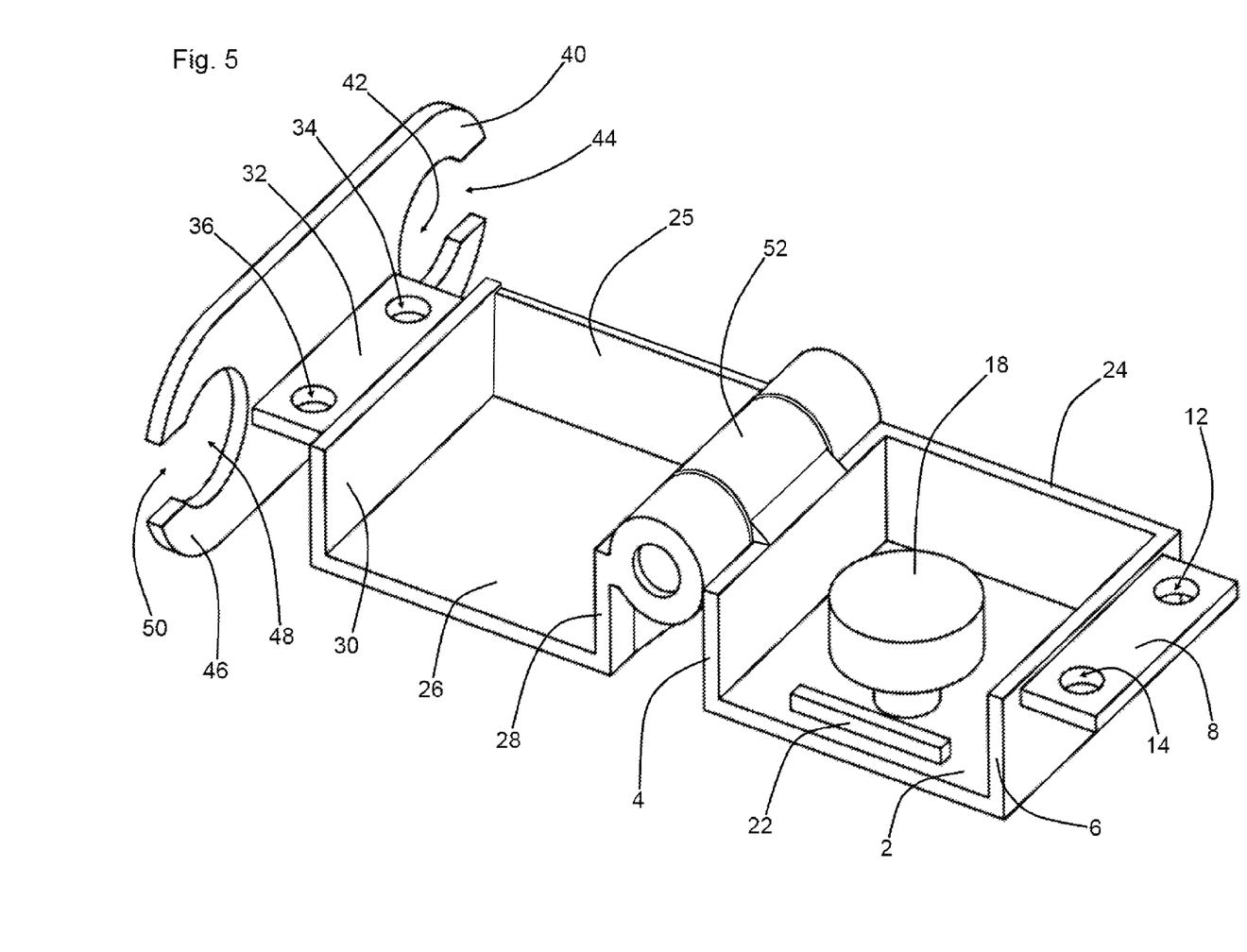
FIG. 5 redepicts the guard of FIG. 1, the view of FIG. 5 showing the guard alternatively pivotally moved to an opened configuration.

Referring simultaneously to FIGS. 1-4, the instant inventive guard 1 preferably further comprises a heavy duty hinge 52 which operatively interconnects the coupler receiving member 2,4,6,24, and the cover member 26,28,30,25, such operative connection being positioned at the upper and lower ends of side walls 4 and 28 (or alternatively and mirroringly upon side walls 6 and 30). Referring further simultaneously to FIG. 5, such coupler receiving and cover members may pivotally move between the closed clamshell configuration depicted in FIG. 1, and the opened trailer hitch coupler receiving position depicted in FIG. 5.

Referring simultaneously to FIGS. 1-5, further structural components of the instant inventive guard 1 preferably comprise a pair of flanges 32 and 8, flange 32 being fixedly attached to and extending rightwardly from the lower end of wall 30, and flange 8 being similarly fixedly attached to and extending rightwardly from the upper end of wall 6. In the preferred embodiment, shackle receiving eyes 34 and 36 extend vertically through flange 32, and shackle receiving eyes 12 and 14 correspondingly extend vertically through flange 8. Upon configuration of the guard 1 in its closed configuration, as depicted in FIGS. 1-4, eyes 34 and 36 preferably vertically align with eyes 12 and 14 so that, referring further simultaneously to FIG. 6, the shackles of preferably circular locks 62 and 60 may extend vertically therethrough.

Referring simultaneously to all figures, in operation, the instant inventive hitch coupler guard 1 may initially be pivoted to the FIG. 5 opened configuration. Thereafter, the guard 1 may be positioned with respect to a trailer hitch coupler (not depicted within views) so that the lower aspect of the front end of the coupler is received within the upwardly and rearwardly opening space defined by floor 2 and by walls 4, 6, and 24. Upon such positioning, the upper disk element 18 of the extraction stopping lug 18,20 advantageously extends upwardly into and is received within such coupler's downwardly opening socket. Thereafter, the covering member 26,28,30,25 may be pivoted from the FIG. 5 position to the FIG. 1 position, causing the trailer hitch coupler to be protectively covered by the guard 1. Upon such pivoting movement to the closed clamshell configuration of FIG. 1, eyes 34 and 36 advantageously vertically align with eyes 12 and 14. Thereafter, the shackles of the circular padlocks 62 and 60 may be extended vertically through such aligned eyes in order to lock flanges 32 and 8 in their mutually overlying and underlying positions, and to lock the guard 1 in the closed clamshell configuration. Removal of the guard 1 from such exemplary trailer hitch coupler is mechanically blocked in all directions, advantageously temporarily disabling the trailer hitch coupler from being used for trailer towing.

Referring further simultaneously to all figures, it may be seen that while the guard 1 is configured in its closed clamshell configuration, and while the guard 1 receives and protectively encloses the above described trailer hitch coupler, the guard's floor and ceiling structures 2 and 4, in combination with its wall structures 4,6,24,28,30, and 25 protect against efforts which may be exerted by a thief to cut the post 20 component of the extraction stopping lug 18,20.

Figure 6:
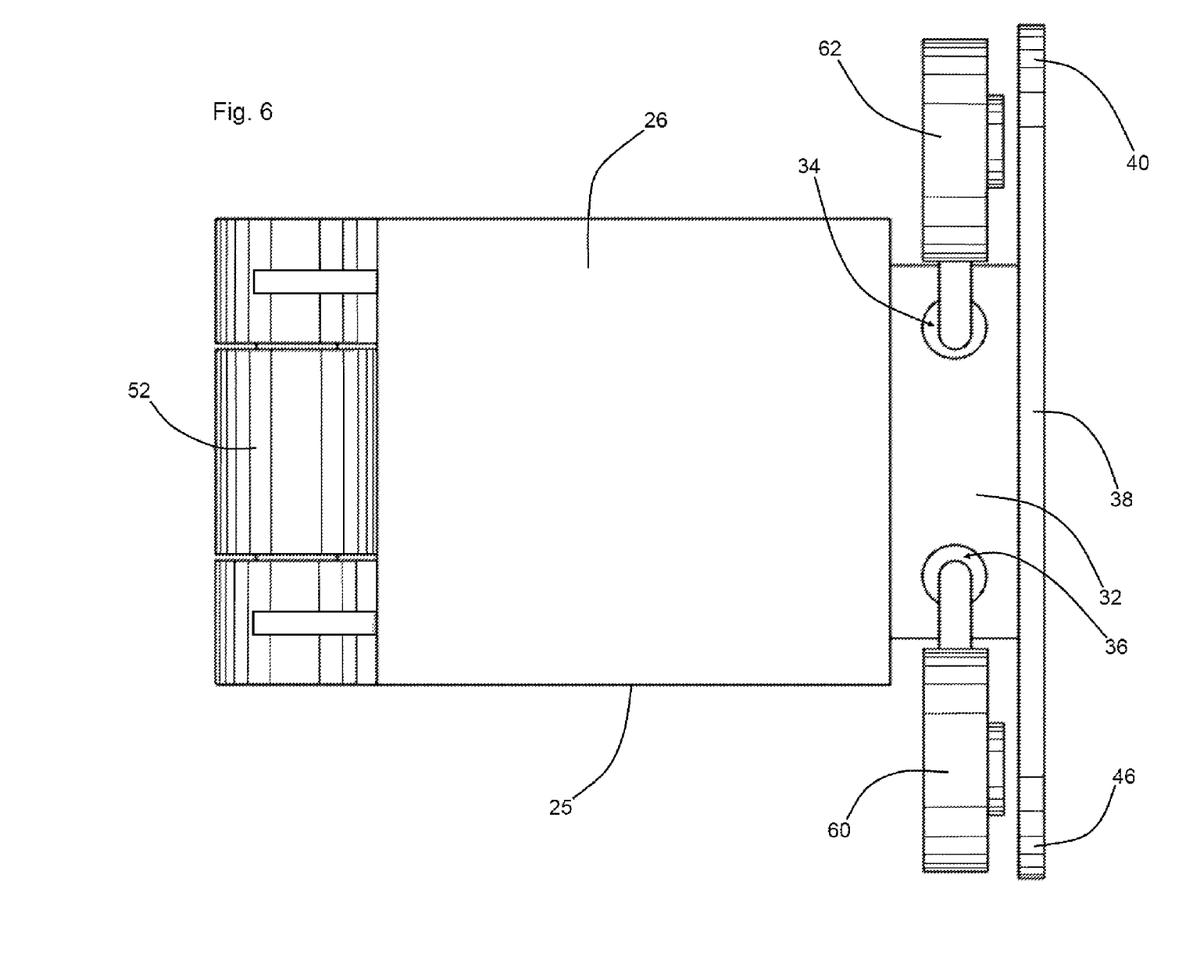
FIG. 6 is an upper plan view of the guard of FIG. 1, the view additionally showing engagements of circular padlocks.
Figure 7:
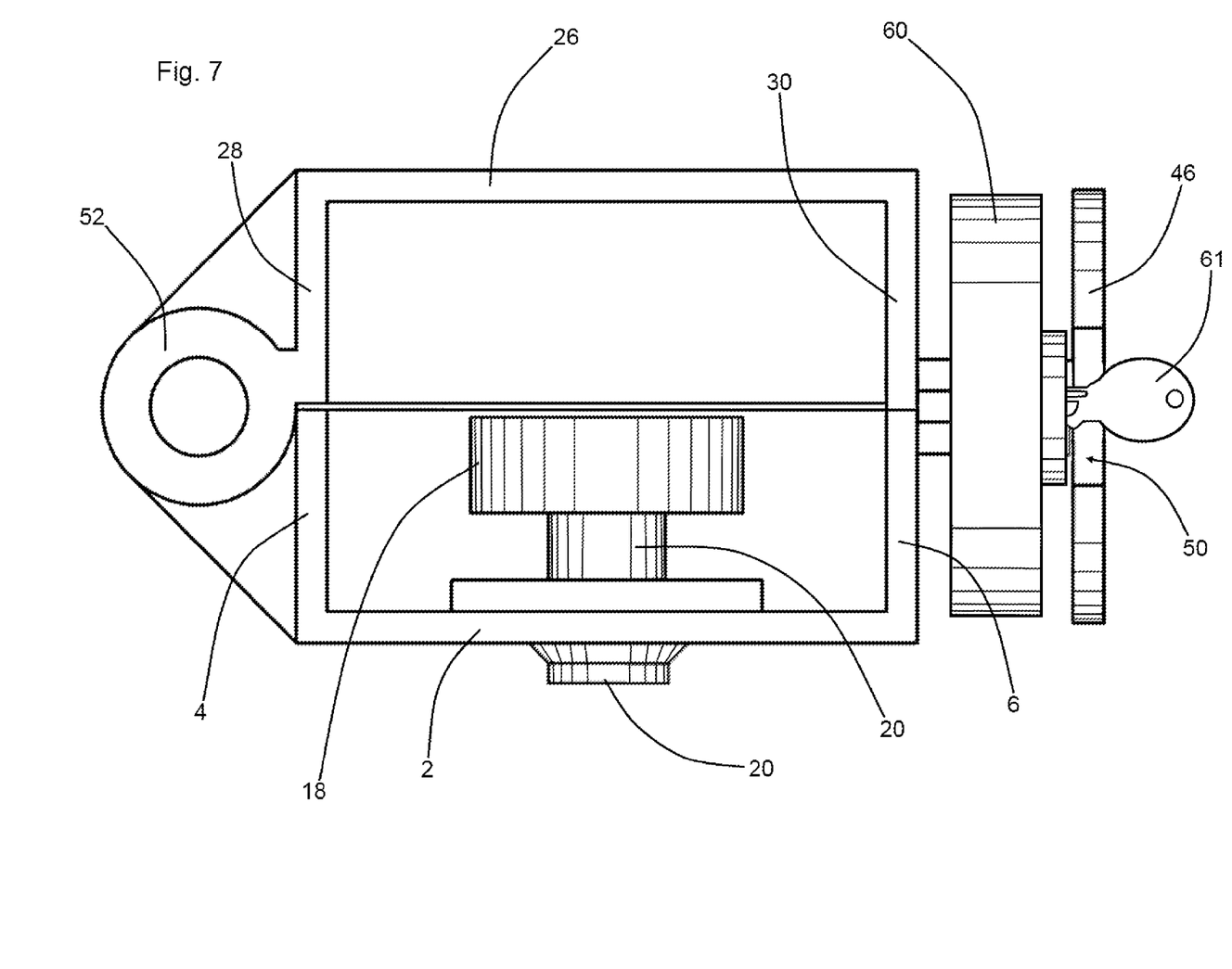
FIG. 7 redepicts the guard of FIG. 2, the view of FIG. 7 additionally showing engagement of a circular padlock and key.

Referring simultaneously to FIGS. 2, 6, and 7, in order to protect against similar metal cutting attacks by the thief directed against the shackles of circular padlocks 62 and 60, a padlock guarding plate 38 is preferably fixedly welded to flange 32 (or alternatively to flange 8). In order to compliment the circular shapes of the preferably used circular padlocks 62 and 60, the plate 38 preferably has semi-circularly curved rearward and forward ends 46 and 40, and in order to facilitate an operator's use of a key 61 for operating such padlocks 62 and 60, key access apertures 48 and 42 are provided, such apertures being positioned upon plate 38 to laterally overlie the key holes of locks 62 and 60. Upon turning of key 61 to withdraw the shackle of circular lock 60 or 62, such lock typically mechanically retains the key 61 within the padlock's key hole. In order to facilitate rearwardly and forwardly directed removals of the padlocks 60 and 62 upon such key actuated withdrawals of their shackles, rearwardly and forwardly opening key clearance slot 50 and 44 are preferably provided. In operation, the padlock guarding plate 38 advantageously functions in combination with side walls 30 and 6 and with flanges 32 and 8 to form shackle protecting channels 33 and 9.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A trailer hitch coupler guard comprising:
   (a) a trailer hitch coupler receiving member defining an interior space;
   (b) a trailer hitch coupler covering member defining an interior space;
   (c) an extraction stopping lug fixedly attached to and extending upwardly from the trailer hitch coupler receiving member;
   (d) a hinge operatively interconnecting the trailer hitch coupler receiving member and the trailer hitch coupler covering member, said hinge facilitating movement of the trailer hitch coupler covering member between opened and closed positions, the trailer hitch coupler covering member overlying the trailer hitch coupler receiving member upon movement to the closed position, and the trailer hitch coupler covering member being displaced away from the closed position upon movement to the opened position;
   (e) a pair of eyed flanges, each flange among said pair of eyed flanges being fixedly attached to one of the members among the trailer hitch coupler receiving member and the trailer coupler covering member; said flanges' eyes being positioned for, upon the movement of the trailer hitch coupler covering member to the closed position, alignment with each other; wherein the trailer hitch coupler receiving member comprises a floor and left, right, and front walls, and wherein the trailer hitch coupler covering member comprises a ceiling and left, right, and front walls; wherein the extraction stopping lug comprises a disk and post combination, said combination's post having a lower end, and wherein the post's lower end is attached to the floor; the interior spaces of the trailer hitch coupler receiving member and covering member housing the extraction stopping lug upon movement of the trailer hitch coupler covering member to its closed position; wherein the hinge joins the trailer hitch coupler covering member's and trailer hitch coupler receiving member's left or right walls; wherein the eyed flanges extend oppositely from the hinge; wherein each flange among the pair of eyed flanges has a distal end; and wherein said guard further comprises a padlock guarding plate, said plate being perpendicular to and fixedly attached to one of said distal ends such that together said plate and said flanges form the shape of a capital letter T.

2. The trailer hitch coupler guard of claim 1 further comprising at least a first shackle protecting channel, said channel being bounded by one of the eyed flanges, by the padlock guarding plate, and by one of the walls among the trailer hitch coupler receiving member's and trailer hitch coupler covering member's left and right walls.

3. The trailer hitch coupler guard of claim 2 further comprising at least a first key access aperture, said aperture extending through the padlock guarding plate.

4. The trailer hitch coupler guard of claim 3 further comprising at least a first key clearance slot, said slot extending through the padlock guarding plate, and said slot communicating with the at least first key access aperture.

* * * * *